UNITED STATES PATENT OFFICE.

FRIEDRICH SCHMIDT AND OTTO ERNST, OF HÖCHST-ON-THE-MAIN, GERMANY, ASSIGNORS TO THE FARBWERKE, VORMALS MEISTER, LUCIUS & BRÜNING, OF SAME PLACE.

TRISAZO DYE.

SPECIFICATION forming part of Letters Patent No. 582,958, dated May 18, 1897.

Application filed March 5, 1897. Serial No. 625,987. (Specimens.)

*To all whom it may concern:*

Be it known that we, FRIEDRICH SCHMIDT and OTTO ERNST, doctors of philosophy, citizens of the Empire of Germany, residing at Höchst-on-the-Main, Germany, have invented certain new and useful Improvements in the Manufacture of Trisazo Dyestuffs, of which the following is a specification.

Our invention relates to the manufacture of a bluish-black trisazo dyestuff which can be developed in the fiber with considerable strength and fastness.

We have found that dioxynaphthalenemonosulfonic acid 1.8.4 is capable of combining with two molecules of a diazo compound, and gives a valuable black direct-dyeing cotton dyestuff by combining one molecule of diazonaphthalenesulfonic acid with said acid and then combining the monoazo dyestuff thus formed with one molecule of tetrazotized benzidin to a so-called "intermediary product," which is capable of being further diazotized by combining it with metaphenylendiamin or one of its homologues, so that a trisazo dyestuff of the combination

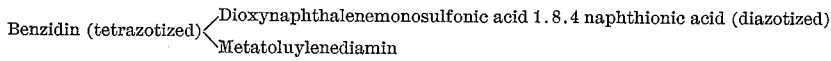

is obtained.

Our improved process is carried out as follows: 5.18 kilograms of the monoazo dyestuff from dioxynaphthalenemonosulfonic acid 1.8.4 and diazotized naphthylaminsulfonic acid are dissolved with four kilograms of soda in the requisite quantity of water. Into this solution is run, under continuous stirring and at a low temperature, a tetrazo solution obtained in the usual manner from 1.84 kilograms of benzidin. After some time (one to two hours) the difficultly-soluble intermediary product is formed and poured into a solution of about 1.3 kilograms of metatoluylenediamin and about 1.5 kilograms of soda in water. After several hours' stirring the formation of the dyestuff is completed. The minor part of the dyestuff is dissolved and isolated in the usual way by common salt.

In a dry state our improved black dyestuff forms a grayish-brown powder soluble in water, with a blue-violet color. By adding ammonia the color turns a dull-red violet. It is soluble in concentrated sulfuric acid, with a blue color. By the addition of water the dyestuff is precipitated as a gray-violet powder. The direct-dyeing color of four per cent. on unmordanted cotton is bluish black. The dyestuff can be diazotized and developed on the fiber, whereby a considerable increase in dyeing strength and fastness is obtained.

Having thus described our invention, we claim as new and desire to secure by Letters Patent—

1. The process herein described of producing a bluish-black trisazo dyestuff, which consists in combining one molecule of diazonaphthalenesulfonic acid with one molecule of dioxynaphthalenemonosulfonic acid 1.8.4, subjecting the monoazo dyestuff thus formed to the action of one molecule of tetrazotized benzidin until a so-called "intermediary" product is obtained, and lastly treating this intermediary product with metaphenylendiamin, substantially as described.

2. The new trisazo dyestuff, of the combination:

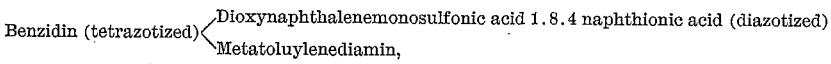

forming in a dry state a grayish-brown powder, soluble in water with a blue-violet color, turning to a dull-red violet on addition of ammonia; soluble with a blue color in concentrated sulfuric acid; the direct-dyeing color of four per cent. on unmordanted cotton being bluish black, substantially as set forth.

In testimony that we claim the foregoing as our invention we have signed our names in presence of two subscribing witnesses.

FRIEDRICH SCHMIDT.
OTTO ERNST.

Witnesses:
HEINRICH HAHN,
ALFRED BRISBOIS.